Nov. 14, 1950 J. R. WOODYARD 2,530,110

NONLINEAR CIRCUIT DEVICE UTILIZING GERMANIUM

Filed June 2, 1944

INVENTOR
JOHN R. WOODYARD
BY
ATTORNEY

Patented Nov. 14, 1950 2,530,110

UNITED STATES PATENT OFFICE 2,530,110

NONLINEAR CIRCUIT DEVICE UTILIZING GERMANIUM

John R. Woodyard, Garden City, N. Y., assignor to The Sperry Corporation, a corporation of Delaware Application June 2, 1944, Serial No. 538,404

11 Claims. (Cl. 175—366)

My invention relates to non-linear or unidirectional circuit devices.

An object of the invention is to provide improved non-linear or unidirectional circuit devices.

A further object is to provide unidirectional or non-linear devices utilizing germanium, which may be employed for detection, rectification, or other purposes.

A further object of the invention is to provide unidirectional current detecting devices having high conversion efficiency and high ratio of forward-to-back resistance.

Another object is to provide materials suitable for producing "N" type rectification or for conducting current by electron migration.

An additional object of the invention is to provide rectifier material which may be employed as a rectifier or as a radio detector with a point contact, or which may be used in equal area type rectifiers.

Still another object is to provide a high power rectifier with a high front-to-back ratio.

Still another object of the invention is to provide rectifier material which may be employed to produce negative resistance elements.

Still another object is to provide rectifier material capable of withstanding radio-frequency impulses of short duration and high voltage without "burning out" or losing efficiency.

Other and further objects, features and advantages of the invention will become apparent as the description proceeds.

In carrying out the invention in its preferred form, the semi-conductor germanium with a trace of an added ingredient is employed as the rectifier material. I have found that pure germanium has a rectifying effect, though poor, and that the presence of impurities interferes with obtaining the desired characteristics unless the percentage and nature of the impurities are precisely controlled. In order to cause the rectifier material to contain only the desired ingredients and only in the desired percentage, I prefer to prepare pure germanium and to alloy it with a controlled percentage of another element, such as an element in the nitrogen group of the periodic table which is solid at ordinary temperatures. For example, germanium-phosphorus alloy may be employed.

A better understanding of the invention will be afforded by the following detailed description considered in conjunction with the accompanying drawing, and those features of the invention which are believed to be novel and patentable will be pointed out in the claims appended hereto.

In order to prepare germanium without an objectionable degree of impurity, it is preferably prepared from its oxide and reduced by roasting in a reducing atmosphere. In order to supply a controlled minute percentage of an additional ingredient, the ingredient is added in the form of a rich alloy. For producing the rich alloy with a substance such as phosphorus, which tends to volatilize readily although it is solid at ordinary temperatures, a special procedure is employed, which will be described hereinafter.

I found a suitable method of preparing pure germanium to be as follows: Germanium dioxide was placed in a quartz-crucible in a hydrogen furnace at 400° C. The temperature was then gradually raised to 600° C. over a period of one hour, thus being maintained at a temperature below the volatilization temperature of germanium monoxide. At the end of this time, the germanium was completely reduced and in the form of a finely divided powder. The powder was then transferred to a carbon crucible and heated in the hydrogen furnace for one-half an hour at a temperature of 1200° C. which fused the particles together to form a solid ingot or lump. The carbon acts to remove certain impurities in the germanium. By carrying out the initial reduction at a low temperature as described, 100% recovery was obtained. The avoidance of a high initial temperature prevented a volatile suboxide or monoxide from being formed with resultant loss of much material.

The germanium dioxide was a very pure oxide, such as that supplied by the Eagle Picher Company as P-677 oxide, presumably prepared by the germanium tetrachloride process.

Figure 1:
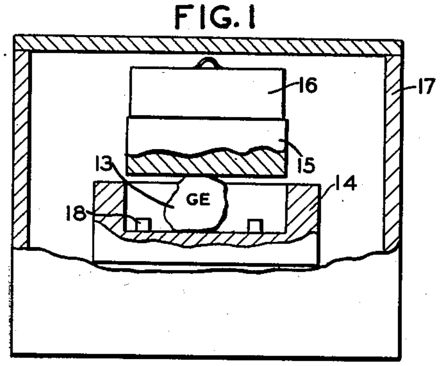
Fig. 1 is a schematic diagram illustrating a method of preparing thin germanium plates constituting an embodiment of my invention.

Plates of germanium were cast as illustrated in Fig. 1 by placing a lump 13 of germanium in a carbon mold 14 under a carbon piston 15 with a weight 16 above the carbon piston. The whole assembly was then heated in a hydrogen furnace 17 for a sufficient length of time to melt the germanium.

For the purpose of determining the thickness of the resulting plate, three small carbon spacers 18 were placed under the piston 15 before it was inserted in the furnace 17.

The germanium prepared by the process described was of high purity as judged by its high electrical resistivity. After three successive fusions of about one hour each in the hydrogen furnace at 1200° C., one sample showed a resistivity of 3.1 ohm centimeters.

The pure germanium exhibited a weak rectification, predominantly "P" type. With impurities present such as aluminum, indium or other elements classified to the left of carbon, silicon and germanium in the Periodic Table of Elements, "P" type rectification is also obtained, but the rectifying properties are poor. I found that "N" type rectification could be obtained with an impurity present which constituted an element to the right of the Carbon group of the Periodic Table. The presence of an impurity such as molybdenum, manganese, iron or platinum, for example, results in N type rectification. For the most desirable characteristics, however, I found it advantageous to employ an added ingredient selected from the Nitrogen group of the Periodic Table which is solid at ordinary temperatures and I found the members of the phosphorus family of this group to be preferable to the other members of the group. That is, I found the best rectification to result with the added ingredient constituting one or, in some cases, more than one of the elements phosphorus, arsenic, antimony and bismuth. These elements are for most purposes preferred in the order named. Where more than one added ingredient was employed, I found arsenic and phosphorus to give best results. In view of the fact that such impurities or added ingredients constitute a very small part of the resulting germanium alloy, they may conveniently be termed minor constituents.

Thus, the elements of the Nitrogen Group consist of nitrogen, phosphorus, arsenic, antimony and bismuth.

As generally understood by those skilled in the art, "N type" rectification signifies that in which current is carried by electron migration, somewhat analogous to the rectifying action of a vacuum tube diode. On the other hand, "P type" rectification signifies that in which current is carried by what may be called "positive carriers" represented by vacant spaces in the crystal lattice structure from which normally present electrons are missing. These "holes" in the lattice structure migrate to carry current when voltage of the required polarity is applied. The types may, of course, be distinguished by the fact that in one case current flows from the external contact to germanium and in the other case flows in the opposite direction when an alternating voltage is applied.

In order to produce a rectifier with improved rectification characteristics, a quantity of high purity germanium, prepared as described, was mixed with an additional element, preferably an element of the nitrogen group such as phosphorus or an element of the same family in the nitrogen group, such as arsenic and antimony, all of which are solid at ordinary temperatures, although phosphorus and arsenic volatilize readily. For better control of proportions, the mixing was carried out in steps, first preparing a rich alloy which was diluted by mixture with pure germanium to form an intermediate alloy which was in turn further diluted to form germanium material with but a trace of added ingredient. Each mixture was accomplished by finely powdering a pure germanium ingot which had been prepared as already described, and likewise finely powdering the added ingredient or rich alloy, mixing the powder and fusing in a hydrogen furnace.

In the case of arsenic, antimony or other elements of like physical characteristics, the rich alloy was prepared by mixing the powdered element with powdered germanium and fusing. However, in the case of phosphorus, a special procedure was employed to avoid loss of phosphorus. The rich alloy of phosphorus and germanium was produced by mixing finely divided germanium and phosphoric acid with pure carbon powder to form a thick paste. Carbon powder such as obtained from sugar charcoal or very pure graphite was found suitable. The paste was put into a quartz-crucible, covered with dry carbon powder and heated in an oxidizing atmosphere for several hours, the temperature being brought up to about 1000° C. or slightly above the melting point of germanium. The apparent reaction was the production of carbon monoxide, which reduced the phosphoric acid to phosphorus, which immediately alloyed with the germanium. Droplets of germanium alloyed with phosphorus flowed away from the powdered charcoal and were recovered upon solidification.

Figure 2:
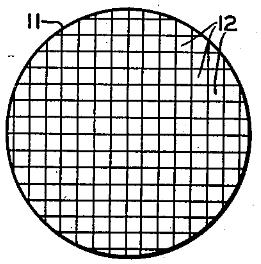
Fig. 2 is a diagram illustrating a step in the process.

When the desired proportion of germanium and added ingredient are obtained by successive dilution, as previously described, the fused ingot may be broken up into small pieces for use as crystal detectors. However, I found it preferable to cast a thin plate about thirty mils thick. As illustrated in Fig. 2, grooves 12 were scribed by means of a diamond glass cutter. The plate was then broken up into small squares by fractioning along the grooves. Such plates were cast in the same manner as casting pure germanium plates, viz., in a carbon mold under pressure, as described in connection with Fig. 1.

In the case of phosphorus, arsenic and antimony in order to obtain a high "front-to-back" ratio, the ingredient is preferably alloyed with the germanium in a proportion of approximately 0.1% added ingredient, the remainder germanium. Higher percentages increase the conductivity and are for this reason useful for power rectifiers. However, I have found that satisfactory rectification characteristics may be obtained where the percentage of phosphorus or the like is within a range from about .05% to about 1.0%.

Where a very high ratio of forward to back current is desired, I consider the germanium-phosphorus alloy to be preferable. On the other hand, where maximum forward current carrying capacity is desired, the arsenic alloy appears to have some advantage over the phosphorus alloy. This characteristic was improved in the arsenic alloy by impulsing with a higher voltage for a few microseconds, whereas the other alloys were unaffected by impulsing and responded in the same manner to gradually increasing voltage as to suddenly applied voltage.

The following table is illustrative of the rectification characteristic obtained from the .1% alloy and the pure germanium.

| | Current at +1 volt | Current at −1 volt |
|---|---|---|
| Ge+P | 10—30mA | 0—.05mA |
| Ge+As | 60—80 | .01—.1 |
| Ge+Sb | 40—60 | .01—.1 |
| Ge (pure) | 7—12 | 0—.5 |

The range in current represents variations in readings with a platinum-point contact at various spots on the surface of a rectifier plate.

Figure 3:
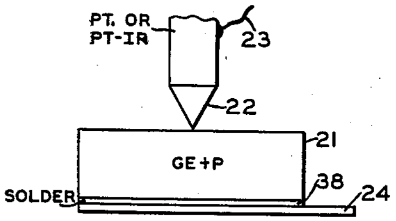
Fig. 3 is a diagram of a rectifier or crystal detector of the point contact type.

For high sensitivity rectifiers and detectors, such as for detecting or demodulating ultra high frequency modulated waves, a rectifier of the point contact type is preferably employed. For example, as illustrated in Fig. 3, a plate 21 of germanium-phosphorus alloy is employed with terminal means, such as a contact point 22 of a relatively hard material such as platinum or platinum-iridium alloy with approximately 30% iridium and the remainder platinum. The rectification characteristic is normally "N" type, but with some samples, if the pressure of the point 22 on the germanium alloy plate 21 is varied sufficiently, P type rectification may be obtained. The point 22 and the pressure applied are preferably heavier than was customary for catwhiskers of galena type radio detectors, but lighter than was customary for the contact needle of Carborundum type radio detectors.

It will be understood that one electrical connection may be made directly to the point 22 by securing a conductor 23 in electrical contact therewith. For effecting an electrical connection with the semi-conductor alloy or rectifier plate 21, terminal means, such as a metallic terminal plate 24 is preferably soldered to the surface of the member or plate 21 or the germanium plate 21 may be soldered to a brass rod. I found that ordinary soft solder (lead-tin alloy) may satisfactorily be employed for this purpose, thus rendering my rectifier plate superior to other rectifier materials which can not be tinned with solder. The layer of solder is shown at 38.

In order to improve the rectifying characteristics of the plate 21, it is advantageous to etch the surface. The plate may be immersed in an etching solution of 3% hydrogen peroxide for ½ an hour or more. However, I have found that a mixture of 5% hydrofluoric acid and 95% nitric acid etches faster and produces a polished surface in about five minutes. Such etching brings out large single crystals.

Under optimum conditions, resistances of two ohms and a million ohms, respectively, were obtained for opposite directions of current flow of a point-contact germanium-phosphorus rectifier with one volt applied between contacts. A ratio of 10 to 100,000 ohms is readily obtained.

Figure 5:
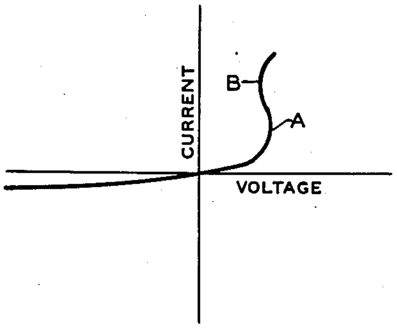
Fig. 5 is a graph illustrating the principle involved in negative resistance phenomena.

In some samples of germanium-alloy rectifiers using point contacts, isolated spots of negative resistance were found. Such negative resistance rectifiers were discovered by search and test. The resistance characteristic of such a negative-resistance spot is illustrated in the curve of Fig. 5 in which voltage between rectifier contacts is plotted in a horizontal direction and the current is plotted in a vertical direction.

It will be observed that with increasing applied voltage, the current increases non-linearly to the point A at which the voltage reaches a maximum and an increase in current takes place with decreasing potential difference between the contacts of the rectifier until the current has reached the point B, whereupon the current-voltage curve again has a positive slope, but remains non-linear. If a suitable resonant element is included in the circuit, oscillations tend to take place by reason of the negative resistance characteristic, that is, the negative slope of the curve between point A and point B.

Figure 6:
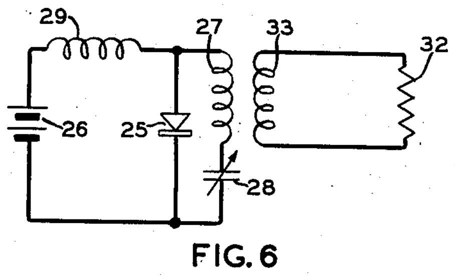
Fig. 6 is a circuit diagram illustrating an application of the rectifier, material as a negative resistance element of an oscillator circuit.

For example, as illustrated in Fig. 6, a rectifier 25 may be connected to a source of direct current 26 and a series tuned circuit comprising an inductance coil 27 and a condenser 28 may be connected across the rectifier 25. A radio frequency choke 29 is preferably connected in series with source 26. For transferring radio frequency oscillations to a load 32, a coil 33 may be coupled to the coil 27. Oscillations take place at a frequency determined by the constants of the resonant circuit 27—28, in a manner analogous to the operation of a continuous-wave Poulsen arc generator.

I found that such negative-resistance rectifier units produce oscillations satisfactorily over a wide range of frequencies including a frequency at least as low as 50 kilocycles and as high as 1 megacycle per second at 10 milliwatts output.

Figure 4:
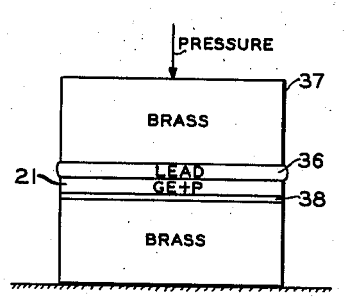
Fig. 4 is a diagram of a rectifier of the equal area type.

Such negative-resistance units may be employed as converters, first detectors or microwave demodulators in microwave receivers for the purpose of increasing the conversion efficiency.

Where rectification of relatively heavy currents is desired, the germanium-phosphorus or other alloy of germanium may be utilized in rectifiers of the equal-area type such as illustrated in Fig. 4. A power rectifier was produced by soldering a semi-conductor plate or wafer 21 of a germanium base alloy to a terminal means, such as a brass rod 35 and covering the wafer with a layer of sheet lead 36. A second brass rod 37, also constituting terminal means, was placed in contact with the lead sheet 36. Thereupon the assembly was clamped with sufficient pressure to cause the lead to flow. When electrical connections were thereafter made between the brass rods 35 and 37, alternating currents of over 800 amperes per square inch of wafer area were rectified. It will be observed that the semi-conductive member or material 21 in the arrangement of Fig. 4 lies in contact with two conductors having different work functions, namely a sheet of lead 36 above and a film 38 of lead-tin alloy (solder) below, both in intimate contact with the surfaces of the semi-conductive wafer or plate 21. Thus an asymmetrical electrical contact with the germanium material is provided.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention which is defined in the appended claims.

What is claimed is:

1. A rectifier comprising a plate of germanium-phosphorus alloy, and a point of hard conducting material in contact with the surface of the plate.

2. A rectifier as in claim 1 in which the germanium is alloyed with approximately $\frac{1}{10}$ of 1% of phosphorus.

3. A rectifier as in claim 1 in which the germanium is alloyed with between .05% and 1% of phosphorus.

4. A method of improving the rectifying characteristics of predominantly germanium-containing rectifier material which comprises immersing the material for approximately five minutes in a mixture of approximately 5% concentrated hydrofluoric acid and 95% concentrated nitric acid.

5. A unidirectional conducting apparatus comprising a metal contact block, a germanium base alloy united with said block by lead-tin solder, said germanium constituting substantially between 99% and less than 100% of said alloy, the remainder of said alloy being constituted of an element of the nitrogen group, and a substantially flat lead sheet in contact with a surface of said alloy.

6. In substantially unidirectionally conducting apparatus, a semi-conductor alloy plate, first terminal means for making electrical contact with a first part of said alloy plate, and second terminal means for making electrical contact with a second part of said alloy plate, the alloy of said plate being constituted of between 99% and less than 100% germanium with a small amount of phosphorus, said small amount of phosphorus constituting less than 1% of said alloy.

7. Asymmetrically conducting apparatus having a high front-to-back ratio, comprising a layer of alloy, said alloy being constituted of 99% or more and less than 100% of germanium with the remainder made up substantially of an element of the nitrogen group, a first metallic layer in intimate contact with said alloy layer on one side thereof, and a second metallic layer soldered to another side of said alloy layer, said first and second layers of metals having different work functions.

8. Unidirectionally conducting apparatus comprising a metallic conducting block, a wafer constituted of an alloy containing a minor constituent, said minor constituent consisting of 1% or less of one or more of the elements of the nitrogen group, said alloy of said wafer containing 99% and less than 100% of germanium, one of the surfaces of said wafer being soldered to a surface of said block, and a conductive layer positioned in contact with another surface of said wafer, said conducting block and said conductive layer providing terminals for said wafer.

9. Apparatus as in claim 7 wherein said remainder constitutes .05% to 1.0% of said alloy.

10. Unidirectionally conducting apparatus comprising a member, a first conductor in contact with a part of said member, and a second conductor in contact with a different part of said member, said member being constituted of a germanium base alloy, said alloy having a minor constituent constituted of one or more elements of the nitrogen group, said alloy containing 99% and less than 100% of germanium, said alloy further containing 1% or less of said minor constituent.

11. Apparatus as defined in claim 6 wherein said small amount of phosphorus constitutes .05% to 1.0% of said alloy.

JOHN R. WOODYARD.

REFERENCES CITED

The following references are of record in the file of this patent:

UNITED STATES PATENTS

| Number | Name | Date |
|---|---|---|
| 724,524 | Tilden | Apr. 7, 1903 |
| 1,118,228 | Pickard | Nov. 24, 1914 |
| 1,329,761 | Gage | Feb. [illegible], 1920 |
| 1,602,542 | Marden | Oct. 12, 1926 |
| 1,792,781 | Thilo | Feb. 17, 1931 |
| 1,856,865 | Darrah | May 3, 1932 |
| 1,926,884 | Presser | Sept. 12, 1933 |
| 2,154,027 | Brennan | Apr. 11, 1939 |
| 2,175,016 | Brunke | Oct. 3, 1939 |
| 2,266,430 | Matthews | Dec. 16, 1941 |
| 2,375,355 | Fahraeus | May 8, 1945 |

OTHER REFERENCES

A Comprehensive Treatise on Inorganic and Theoretical Chemistry by J. W. Miller, vol. VII, pages 259–260. Copy in Div. 59.

Proceedings National Academy of Sciences, vol. II, 1925, an article by E. Merritt: On Contact Rectification by Metallic Germanium, pp. 743–748. Copy in Div. 48.

Zeitschrift fur Anorganische und Allgemeine Chemie, vol. 244, pages 205–23. Copy in Scientific Library.